Aug. 11, 1959     L. C. WILLIAMS     2,898,937
ROTARY VALVE STRUCTURE
Filed Feb. 23, 1955     2 Sheets-Sheet 1

INVENTOR.
LEO C. WILLIAMS
BY
Bauer and Seymour
ATTORNEYS

Aug. 11, 1959     L. C. WILLIAMS     2,898,937
ROTARY VALVE STRUCTURE
Filed Feb. 23, 1955     2 Sheets-Sheet 2
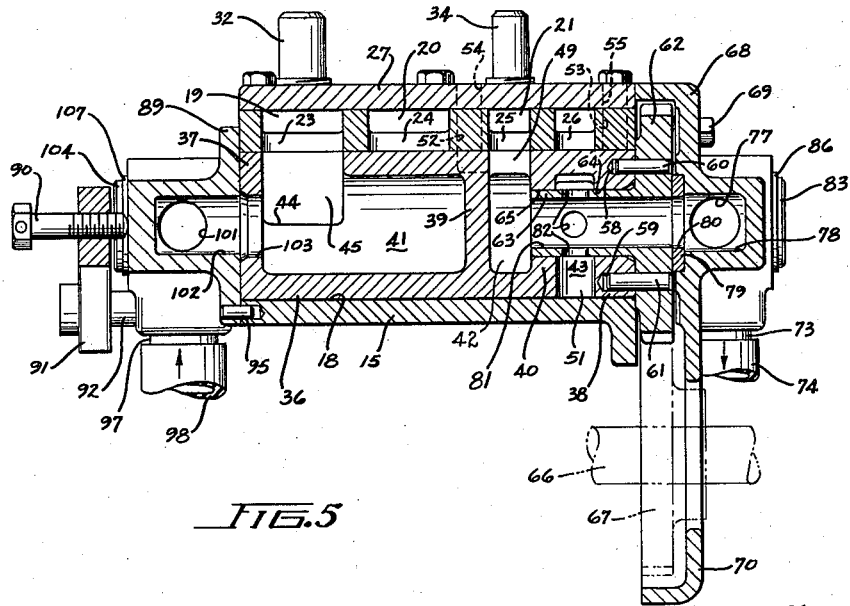
FIG.5
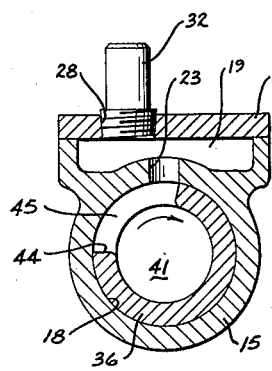
FIG.6
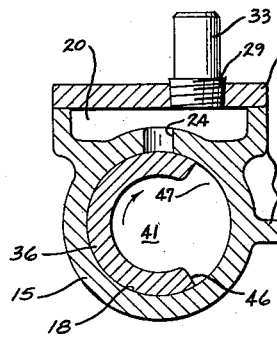
FIG.7
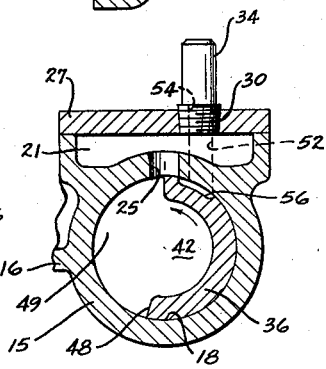
FIG.8
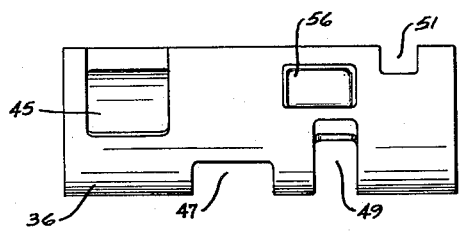
FIG.10
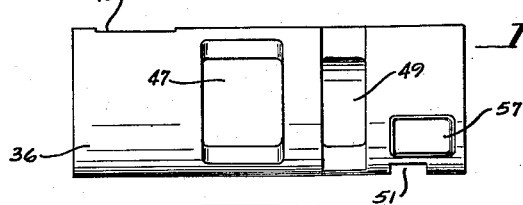
FIG.11
FIG.9
INVENTOR.
LEO C. WILLIAMS
BY
Bauer and Seymour.
ATTORNEYS United States Patent Office 2,898,937
Patented Aug. 11, 1959

2,898,937

ROTARY VALVE STRUCTURE

Leo C. Williams, Pearl River, N.Y., assignor, by mesne assignments, to Miehle-Goss-Dexter, Incorporated, a corporation of Delaware Application February 23, 1955, Serial No. 489,902

15 Claims. (Cl. 137—633)

This invention relates generally to valve mechanisms, and more particularly to a rotary valve which is especially adapted for use in pneumatic systems wherein the making and breaking of vacuum in and the delivery of air under pressure to said systems at regular intervals is desired or required.

One object of the present invention is to provide a novel rotary valve for the purpose above described which is simple in construction and relatively inexpensive to manufacture.

Another object of the invention is to provide a rotary rotor type of valve which is so novelly constructed that air above and below atmospheric pressure is continuously present in the rotor for immediate application, upon rotation of said rotor, to devices utilizing vacuum and compressed air for specific purposes.

Another object is to provide a rotary valve of the above character wherein the vacuum and air pressure ports and passages are arranged and constructed in a novel manner.

A further object is to provide a rotary vacuum and air control valve comprising a single housing or stator and a single rotor in said housing, said housing and rotor being of novel construction whereby the sources of vacuum and compressed air are advantageously connected through the housing with the rotor at the opposite end of the latter, thus materially simplifying the construction of said housing and said rotor, and the operation of the valve as well.

Another object is to provide a rotary vacuum and air control valve of novel construction comprising a stator and a rotor in said stator which is provided with a single air pressure compartment and two interconnected and simultaneously evacuated vacuum compartments and yet is capable of effectively controlling the delivery of air under pressure at different predetermined intervals to two independent devices connected with said valve, and the creating of vacuum at different predetermined intervals in two other independent devices connected with said valve.

Still another object is to provide a rotary rotor type of air and vacuum control valve having auxiliary valve means incorporated therein in a novel manner whereby the sources of air and vacuum connected with said valve may be readily and conveniently disconnected therefrom to interrupt the operation thereof.

The above and further objects and novel features of the invention will more fully appear from the following detail description when the same is read in connection with the accompanying drawings. It is to be expressly understood, however, that the drawings are for the purpose of illustration only and are not intended to define the limits of the invention.

In the drawings, wherein like reference characters refer to like parts throughout the several views, Fig. 1 is a top plan view of a rotary vacuum and air control valve constructed in accordance with the present invention;

Fig. 5 is a vertical longitudinal sectional view taken substantially on the line 5—5 of Fig. 1;

Fig. 6 is a vertical transverse sectional view taken substantially on the line 6—6 of Fig. 1;

Fig. 7 is a fragmentary vertical transverse sectional view taken substantially on the line 7—7 of Fig. 1;

Fig. 8 is a fragmentary vertical transverse sectional view taken substantially on the line 8—8 of Fig. 1;

Fig. 9 is a fragmentary vertical transverse sectional view taken substantially on the line 9—9 of Fig. 1;

Fig. 10 is a detail top plan view of the rotor as it appears in the position thereof shown in Fig. 5; and Fig. 11 is a detail front elevational view of said rotor as it appears in the position thereof shown in Fig. 5.

Figure 1:
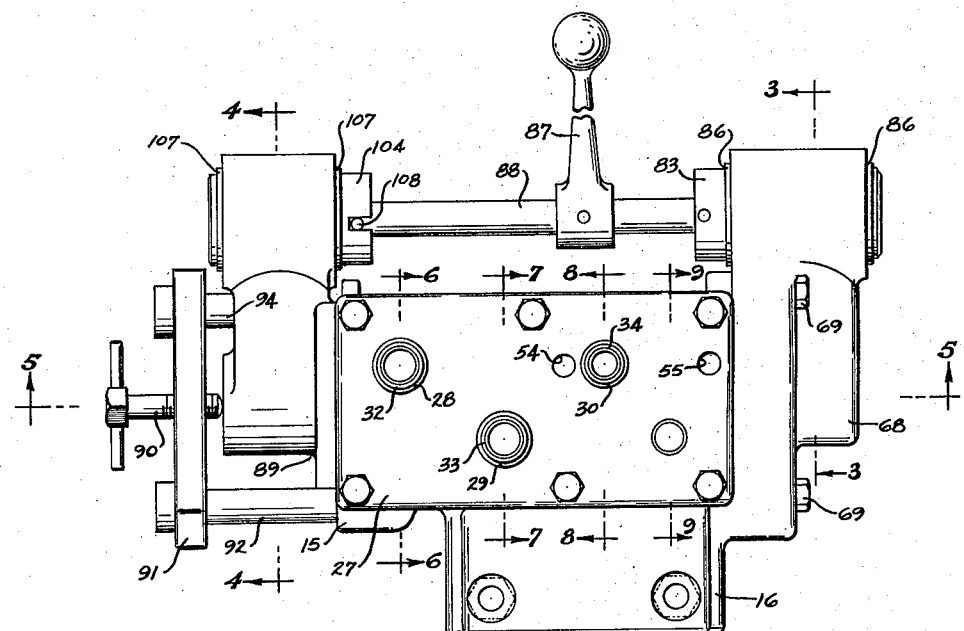

Referring now to the drawings, there is shown, by way of example, one embodiment of a rotary air and vacuum control valve constructed in accordance with the present invention which, while capable of general use and with fluids other than air and vacuum, is particularly adapted for use in existing sheet feeders of the pneumatic type having air blast devices for winding the sheet supply to effect preliminary separation of the sheets, suction devices for lifting the sheets successively from the supply, other suction devices for forwarding the lifted sheets successively from the supply, and other air blast devices for winding each lifted sheet to insure complete separation thereof and to assist in the forwarding thereof, said rotary valve effectively serving to control the making and breaking of vacuum in said suction devices, and the delivery of air under pressure to said air blast devices at proper regular intervals. It will be apparent as the description of the novel rotary valve proceeds that said valve may be easily modified to adapt the same for use with any machine or instrumentality other than sheet feeders, and in pneumatic sheet feeders having less than the above mentioned suction and air blast devices, and to obtain any desired timing of the devices connected with and under the control of said valve.

With the understanding that the novel rotary valve in the form illustrated herein is particularly constructed to control, in a sheet feeder, the operation of two or two sets of suction devices at different timed intervals and two or sets of air blast devices at different timed intervals, the following description of said valve will be directed to such application and will now proceed. As shown, the novel rotary air and vacuum control valve comprises an elongated housing or stator 15 formed at one side thereof with an outwardly projecting horizontal pad-like portion 16 (Figs. 1 and 3) by means of which said housing may be bolted or otherwise suitably secured to a suitable support, as indicated diagrammatically at 17, provided on the sheet feeder or other machine or instrumentality utilizing the valve. The housing 15 is provided substantially in the center thereof with a longitudinally extending true cylindrical bore 18 (Fig. 5) which opens outwardly through opposite ends of said housing. The housing or stator 15 is further provided in the upper surface thereof with four transversely extending axially spaced wells or chambers 19, 20, 21 and 22 (Figs. 5 to 9) which communicate with the bore 18 through narrow elongated passages 23, 24, 25 and 26, respectively, formed in and extending axially of said housing from side to side of the respective chambers. The upper open ends of the chambers 19, 20, 21 and 22 are closed in air-tight relation by a cover plate 27 which is bolted or otherwise suitably secured to the housing 15. The cover plate 27 is provided with a four circular openings 28, 29, 30 and 31 (Figs. 1 and 6 to 9) which communicate with the chambers 19, 20, 21 and 22, respectively, and have threaded therein the lower ends of open-ended tubular fittings or nipples 32, 33, 34 and 35, respectively.

In the illustrated embodiment, 19 and 20 are air pressure chambers and 21 and 22 are vacuum chambers, the chamber 19 is connected with the sheet supply winding device or set of devices by means of a flexible conduit (not shown) engaged over the fitting 32, the chamber 20 is connected with the sheet winding device or set of devices by means of a similar flexible conduit engaged over the fitting 33, the chamber 21 is connected with the suction sheet forwarding device or set of devices by means of a similar flexible conduit engaged over the fitting 34, and the chamber 22 is connected with the suction sheet lifting device or set of devices by means of a similar flexible conduit engaged over the fitting 35.

Disposed within and closey fitting the bore 18 in housing 15 is a hollow rotor 36 (Figs. 5 and 6 to 9) which extends the full length of said bore and said housing and is bounded at the opposite ends thereof by transverse wall portions 37 and 38 formed integrally therewith. The rotor 36 is axially divided by other transverse wall portions 39 and 40 into three axially spaced compartments or chambers, namely, an air pressure compartment 41 which is closed by the walls 37 and 39 and spans the chambers 19 and 20 in the housing 15, a vacuum compartment 42 which is bounded by the walls 39 and 40 and spans the chamber 21 only in said housing, and a vacuum compartment 43 which is bounded by the walls 38 and 40 and spans the chamber 22 only in said housing. The axial portion of the rotor 36 which spans the chamber 19 in the housing 15 has a segment thereof removed, as indicated at 44 (Fig. 6), to provide in said rotor a segmental opening 45 (Figs. 6 and 10) communicating with the compartment 41 in the rotor. The axial portion of the rotor 36 which spans the chamber 20 in the housing 15 has a segment thereof removed, as indicated at 46 (Fig. 7), to provide in said rotor a second segmental opening 47 (Figs. 7 and 11) which is separate from the opening 45 and also communicates with the compartment 41 in the rotor. The axial portion of the rotor 36 which spans the chamber 21 in the housing 15 and contains the compartment 42 has a segment thereof removed, as indicated at 48 (Fig. 8), to provide in said rotor a third segmental opening 49 (Figs. 8 and 11) communicating with said compartment. The axial portion of the rotor 36 which spans the chamber 22 in the housing 15 and contains the compartment 43 has a segment thereof removed, as indicated at 50 (Fig. 9), to provide in said rotor a fourth segmental opening 51 (Figs. 9 and 10) communicating with said compartment.

It will thus be apparent that upon rotation of the rotor 36, the openings 45, 47, 49 and 51 in said rotor will pass into and out of register with the passages 23, 24, 25 and 26, respectively, in the housing 15. In the illustrated embodiment, the openings 45, 47, 49 and 51 are so located at suitable relative positions around the periphery of the rotor 36, and the length of the arc of each of said openings is so chosen that, upon rotation of said rotor one complete revolution from the position thereof shown in Fig. 6 in the direction of the arrows indicated in Figs. 6 to 9, communication is first established between the chamber 19 in the housing 15 and the compartment 41 in the rotor 36, whereupon air under pressure is supplied to the sheet supply winding device or set of devices. While compressed air is being supplied to the sheet supply winding device or devices, communication is established between the chamber 22 in the housing 15 and the compartment 43 in the rotor 36, whereupon vacuum is created in the suction sheet lifting device or set of devices. While vacuum is being created in the suction sheet lifting devices, the above described communication between the housing chamber 19 and the rotor compartment 41 is interrupted and communication is established between the chamber 21 in the housing and the compartment 42 in the rotor, whereupon the delivery of compressed air to the sheet supply winding device or devices is discontinued and vacuum is created in the suction sheet forwarding device or set of devices. Shortly after vacuum is created in the suction sheet forwarding device or devices, communication is established between the chamber 20 in the housing 15 and the compartment 41 in the rotor 36, and the above described communication between the housing chamber 22 and the rotor compartment 43 is interrupted, whereupon air under pressure is supplied to the sheet winding device or set of devices and the connection between the rotor compartment 43 and the suction sheet lifting device or devices is broken. Shortly before the opening 49 in the rotor 36 passes out of register with the passage 25 in the housing 15 to thereby break the connection between the rotor compartment 42 and the suction sheet forwarding device or devices, the above described communication between the housing chamber 20 and the rotor compartment 41 is interrupted and the above described communication between the housing chamber 19 and the rotor compartment 41 is reestablished, whereupon the delivery of compressed air to the sheet winding device or devices is discontinued and the rotor is in position and ready to repeat the above described operations in the next cycle of operation of said rotor.

When communication between the rotor compartment 42 and the housing chamber 21 and between the rotor compartment 43 and the housing chamber 22 is interrupted as above described through rotation of the rotor and movement of the openings 49 and 51 respectively, out of register with the housing passages 25 and 26, respectively, vacuum is broken in the suction sheet forwarding and lifting devices by opening the respective housing chambers 21 and 22 to atmosphere. This is preferably accomplished in the following manner. The housing 15 is provided in the upper surface thereof with two vertically extending ports 52 and 53 (Figs. 5, 8 and 9) which communicate with the bore 18 in said housing and register with similar ports 54 and 55 (Figs. 1, 5, 8 and 9), respectively, that are formed in the cover plate 27 and open outwardly therefrom to atmosphere. The port 52 is located between the housing chambers 20 and 21, and the port 53 is located outwardly of but adjacent to the housing chamber 22. The rotor 36 is provided in the outer peripheral surface thereof with two shallow recesses 56 and 57 (Figs. 8, 9, 10 and 11) which are located close to the trailing edges of the openings 49 and 51, respectively, in said rotor.

The recess 56 in the rotor 36 is of such circumferential width and axial length that at the time the opening 49 in said rotor passes out of register with the passage 25 in the housing 15, said recess is in register with said passage and the port 52 in said housing. Under these conditions, vacuum in the rotor compartment 42 is maintained, but the housing chamber 21, the suction sheet forwarding devices and all the conduits connecting said devices with said chamber are open to atmosphere through the passage 25, the recess 56 and the ports 52 and 54, thus breaking vacuum in said suction devices. Upon continued rotation of the rotor 36, the recess 56 passes out of register with the port 52 and, hence, the passage 25 and the chamber 21 in the housing 15 are again closed to atmosphere so that vacuum can again be created in the suction sheet forwarding devices during the next cycle of operation of the rotor 36.

Likewise, the recess 57 in the rotor 36 is of such circumferential width and axial length that at the time the opening 51 in said rotor passes out of register with the passage 26 in the housing 15, said recess is in register with said passage and the port 53 in said housing. Under these conditions, vacuum in the rotor compartment 43 will still be maintained, but the housing chamber 22, the suction sheet lifting devices and all the conduits connecting said devices with said chamber will be open to atmosphere through the passage 26, the recess 57 and the ports 53 and 55, thus breaking vacuum in said suction devices. After the recess 57 has passed out of communication with the port 53, the passage 26 and the chamber 22 in the housing 15 will be closed to atmosphere so that vacuum may again be established in the suction sheet lifting devices during the next cycle of operation of the rotor 36. It will be apparent that the described compartments and openings in the rotor 36 may be differently arranged and varied in size as desired to suit any condition, machine or instrumentality and to obtain any desired timing condition.

The rotor 36 is provided in the end wall 38 thereof with two diametrically disposed, axially extending sockets 58 and 59 of different diameters (Fig. 5). Loosely engaged in the sockets 58, 59 are dowel pins 60 and 61, respectively, of corresponding diameters. These dowel pins 60, 61 are secured in a suitable manner in a spur gear 62 which is disposed exteriorly of the rotor 36 and housing 15 and is of a diameter larger than that of said rotor. Rotation of the gear 62 is thus transmitted to the rotor 36 through the pins 60 and 61. The gear 62 is thus carried by and drivably connected with the rotor 36 and is formed centrally thereof with an elongated annular hub 63 which projects inwardly therefrom into and through suitable axially aligned openings 64 and 65 provided in the walls 38 and 40, respectively, of said rotor concentric with the axis of rotation of the latter. In the illustrated embodiment, the drive for the rotor 36 is taken from a shaft 66 of the sheet feeder, said shaft being driven continously and such that it makes one revolution for each cycle of operation of said feeder and having keyed thereon a spur gear 67 which meshes with and is of the same diameter as that of the gear 62. Accordingly, the rotor 36 is driven by the described gearing continuously and makes one revolution for each cycle of operation of the feeder.

It will be apparent that the driving connection afforded by the pins 60 and 61 provides for endwise removal of the rotor 36 from the opposite end of the housing 15 for inspection, cleaning, substitution and other maintenance purposes, without disturbing or displacing the driving gear 62, and that said pins being of different diameters provide an orienting connection so that when said rotor or a replacement thereof is reinserted into said housing it will occupy its original and proper angular position with respect to the housing, thereby preserving the timing thereof.

The driven gear 62 and the adjacent end of the bore 18 in housing 15 are covered by a cover bracket 68 which is secured, as by bolts 69, to the adjacent end surface of said housing. The bracket 68 is downwardly extended to provide a guard 70 for the driving gear 67, and the proper angular positioning of said bracket on the housing 15 is obtained by suitable dowel pins 71. The bracket 68 also extends beyond the side of the housing 15 opposite that having the mounting pad 16 formed thereon, and said bracket is provided in and at the bottom of the extended portion thereof with a vertically extending annular opening 72 into which is threaded the upper end of an open-ended tubular fitting or nipple 73. This opening 72 is connected, through the nipple 73 and a flexible conduit 74 fitted over said nipple, with a suitable source of vacuum, such as a suction pump which is usually employed in sheet feeders of the pneumatic type.

The opening 72 in the cover bracket 68 terminates at the upper end thereof in a smaller diameter opening 75 (Fig. 3) which communicates with a horizontal cylindrical bore 76 formed in said bracket and extending therethrough parallel to the axis of rotation of the rotor 36. The bracket 68 has formed therein a horizontal cylindrical passage 77 (Figs. 3 and 5) which extends at right angles to the bore 76 and communicates at one end thereof with said bore. The opposite end of this passage 77 communicates with a horizontal cylindrical passage 78 which is formed in the bracket 68 and extends at right angles to the passage 77 and is located directly in line with the axis of rotation of the rotor 36. The passage 78 is closed at the outer end thereof and opens inwardly through the inner surface of the bracket 68. Removably carried by the bracket 68 and disposed between the latter and the driven gear 62 is a thrust washer 79 having a centrally located circular opening 80 therein which continuously communicates with the passage 78 in said bracket and with a passage 81 formed in and extending axially through the gear 62 and the hub 63 of said gear. This passage 81 opens into the compartment 42 in the rotor 36; and the hub 63 is further formed in the axial portion thereof which spans the compartment 43 in said rotor with a plurality of radial ports 82 for also establishing communication between said passage and the rotor compartment 43.

It will thus appear that the compartments 42 and 43 in the rotor 36 are continuously connected with the vacuum supply or suction pump through the passage 81, ports 82, opening 80, passages 78 and 77, bore 76, openings 75 and 72, nipple 73 and conduit 74, and that by virtue of said passages, openings, etc., such connection is made through the end of the rotor, as distinguished from the side thereof. In this manner, vacuum is continuously available in the rotor compartments 42 and 43 for immediate application, and the rotor 36 is free to rotate without any radial pressure thereon. It is to be noted that when vacuum is created and maintained in the compartments 42 and 43 of the rotor 36 as previously described, an axial thrust in the direction of the cover bracket 68 is imposed by atmospheric pressure upon said rotor, thereby holding the rotor snugly against the gear 62 and the latter, in turn, snugly against the washer 79 to prevent leakage of air therebetween.

Fitted for rotation in the bore 76 in the cover bracket 68 is an auxiliary valve in the form of a rotor 83 (Figs. 1 and 3) having formed therein a passage 84 which opens outwardly through the bottom and one side of said rotor at points spaced 90 degrees apart. The passage 84 is located axially of the rotor 83 in line with the opening 75, passage 77 and a further opening 85 in the bracket 68, said latter opening being located directly opposite the passage 77 and having one end thereof communicating with the bore 76 in said bracket and the opposite end opening outwardly through said bracket to atmosphere. Axial displacement of the auxiliary rotor 83 in opposite directions relative to the bracket 68 is prevented by snap rings 86 which are engaged over the opposite projecting ends of said rotor.

Figures 2, 3:
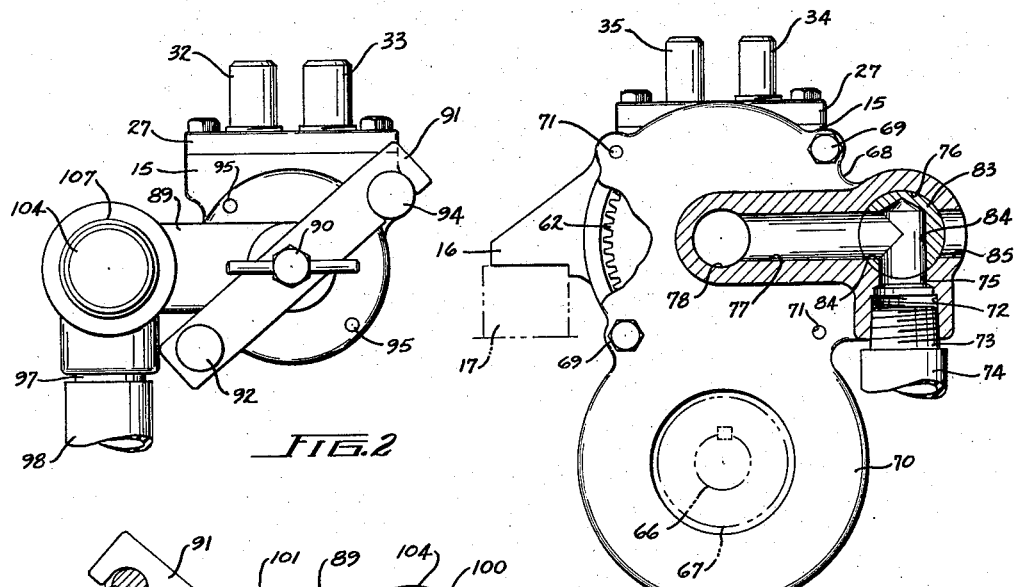
Fig. 2 is an end elevational view of said valve looking from the left of Fig. 1.
Fig. 3 is an end elevational view, partly in section, of said valve looking from the right of Fig. 1, the section being taken substantially on the line 3—3 of Fig. 1, and one of the parts having a portion thereof broken away for purposes of clearer illustration.

Normally, the auxiliary rotor 83 occupies the position thereof shown in Fig. 3 wherein it will be noted that the opening 85 in the cover bracket 68 is closed by said rotor, and that the opening 75 and the passage 77 in said bracket are connected through the passage 84 in the rotor, thus connecting the vacuum supply or suction pump with the main rotor 36 in the housing 15 and enabling evacuation of the compartments 42 and 43 in said rotor for operation of the valve in the manner hereinbefore described. When, however, the auxiliary motor 83 is rotated 90 degrees in a counter-clockwise direction from the position thereof shown in Fig. 3, it will be noted that the passage 77 in the bracket 68 will be closed by said rotor, and that the openings 75 and 85 in said bracket will be connected through the passage 84 in the rotor. Under these conditions, the vacuum supply or suction pump will be disconnected from the main rotor 36 in the housing 15 thereby interrupting the vacuum controlling operation of the valve, and said vacuum supply or suction pump will be connected to the atmosphere to relieve the same.

In the illustrated embodiment, rotation of the auxiliary rotor 83 in opposite directions to provide for or interrupt the vacuum controlling operation of the main rotor 36 in housing 15 is effected manually at will under the control of the operator by means of a handle 87 which is suitably secured to a short shaft 88 that is pinned or otherwise suitably secured at one end thereof to one end of the auxiliary rotor 83. It will be understood that rotation of the auxiliary rotor 83 in the direction to interrupt the vacuum controlling function of the main rotor 36 may be effected automatically by operatively connecting the shaft 88 with the sheet calipering and absence sheet detecting devices which are usually employed in pneumatic sheet feeders to interrupt the feeding action whenever an abnormal condition in the feed of the sheets exists.

The opposite end of the rotor bore 18 in housing 15 is closed by a cover bracket 89 (Figs. 1, 2, 4 and 5) which is releasably clamped against the adjacent end surface of said housing by a jam screw 90 that is adjustably threaded in a retaining bar 91 and engaged with said bracket under sufficient pressure to firmly hold the bracket against the housing in air-tight relation. The bar 91 extends diagonally across the bracket 89 and is pivotally mounted at one end thereof on a headed stud 92 and is notched, as at 93, at the other end thereof for engagement over a headed stud 94, said studs being suitably secured to the housing 15. By virtue of this construction, the bracket 89 may be easily removed from the housing 15 by simply loosening the jam screw 90 and swinging the bar 91 clear of said bracket, thus facilitating the withdrawal of the rotor 36 from said housing for inspection, cleaning, repair, replacement, substitution and other maintenance purposes. The proper angular positioning of the bracket 89 on the housing 15 is obtained by dowel pins 95.

The cover bracket 89, like the cover bracket 68, extends beyond the side of the housing 15 opposite that having the mounting pad 16 formed thereon, and said bracket 89 is provided in and at the bottom of the extended portion thereof with a vertically extending circular opening 96 (Fig. 4) into which is threaded the upper end of an open ended tubular fitting or nipple 97. This opening 96 is connected, through the nipple 97 and a flexible conduit 98 fitted over said nipple, with a suitable source of compressed air, such as an air pressure storage tank which is usually employed in sheet feeders of the pneumatic type and is continuously supplied with air under pressure by an air pump connected therewith.

The air inlet opening 96 in cover bracket 89 terminates at the upper end thereof in a smaller diameter opening 99 (Fig. 4) which communicates with a horizontal cylindrical bore 100 formed in said bracket and extending therethrough parallel to the axis of rotation of the rotor 36. The bore 100 in bracket 89 is located in axial alignment with the bore 76 in the cover bracket 68 previously described. The bracket 89 has formed therein a horizontal cylindrical passage 101 which extends at right angles to the bore 100 and communicates at one end thereof with said bore. The opposite end of the passage 101 communicates with a horizontal cylindrical passage 102 which is also formed in the bracket 89 and extends at right angles to the passage 101. This passage 102 is located in line with the axis of rotation of the rotor 36 and is closed at the outer end thereof. The passage 102 opens inwardly through the inner surface of the bracket 89 and continuously communicates with a circular opening 103 which is formed in and extends axially through the end wall 37 of the rotor 36 and in turn communicates with the compartment 41 in said rotor.

It will thus appear that the compartment 41 in the rotor 36 is continuously connected with the source of compressed air or storage tank through the opening 103, passages 102 and 101, bore 100, openings 99 and 96, nipple 97, and conduit 98, and that by virtue of said passages, openings, etc., such connection is made through the end of the rotor as distinguished from the side thereof. In this manner, air under pressure is continuously available in the rotor compartment 41 for immediate use, and the rotor 36 is free to rotate without any radial pressure thereon. It is to be noted that when air under pressure is delivered to and maintained in the compartment 41 of the rotor 36 as previously described, an additional axial thrust in the direction of the cover bracket 68 is imposed by said air upon said rotor, thereby further holding the rotor snugly against the gear 62 and the latter, in turn, snugly against the washer 79 to maintain a good air-tight seal between the same.

Fitted for rotation in the bore 100 in the cover bracket 89 is an auxiliary valve in the form of a rotor 104 (Figs. 1, 2 and 4) having formed therein a passage 105 which opens outwardly through the bottom and one side of said rotor at points spaced 90 degrees apart. The passage 105 is located axially of the rotor 104 in line with the opening 99, passage 101 and a further opening 106 in the bracket 89, said latter opening being located directly opposite the passage 101 and having one end thereof communicating with the bore 100 in said bracket and the opposite end opening outwardly through said bracket to atmosphere. Axial displacement of the auxilary rotor 104 in opposite directions relative to the bracket 89 is prevented by snap rings 107 which are engaged over the opposite projecting ends of said rotor.

Figure 4:
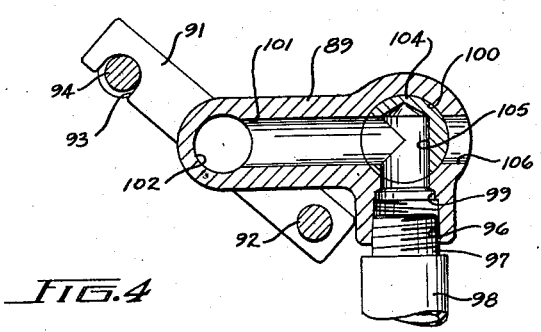
Fig. 4 is a vertical transverse sectional view taken substantially on the line 4—4 of Fig. 1.

Normally, the auxiliary rotor 104 occupies the position thereof shown in Fig. 4 wherein it will be noted that the opening 106 in the cover bracket 89 is closed by said rotor, and that the opening 99 and passage 101 in said bracket are connected through the passage 105 in the rotor, thus connecting the compressed air supply or storage tank with the main rotor 36 in the housing 15 and enabling delivery of air under pressure into the compartment 41 of said main rotor for use during operation of the valve in the manner hereinbefore described. When, however, the auxiliary rotor 104 is rotated 90 degrees in a counter-clockwise direction from the position thereof shown in Fig. 4, it will be noted that the passage 101 in the bracket 89 will be closed by said rotor, and that the openings 99 and 106 in said bracket will be connected through the passage 105 in the rotor. Under these conditions, the compressed air supply or storage tank will be disconnected from the main rotor 36 in the housing 15 thereby interrupting the air pressure controlling operation of the valve, and said compressed air supply or storage tank will be connected to the atmosphere to relieve the same.

In the illustrated embodiment, rotation of the auxiliary valve or rotor 104 in opposite directions to provide for or interrupt the air pressure controlling operation of the main rotor 36 in housing 15 is effected simultaneously with the rotation of the auxiliary valve or rotor 83. For this purpose, the shaft 88 is extended and is connected at the opposite end thereof with the auxiliary valve or rotor 104, said connection being preferably made by pin and slot means 108 (Fig. 1) so as to facilitate assembling and positioning of said rotor, as well as removal of the same and the auxiliary rotor 83 from the cover brackets 89 and 68, respectively, for inspection, cleaning, replacement and other maintenance purposes. Obviously, the auxiliary rotor 104 may, if desired, be arranged for manual rotation independently of the auxiliary rotor 83.

Although only one embodiment of the present invention has been illustrated in the accompanying drawings and described in the foregoing specification, it is to be expressly understood that said invention is not limited to said embodiment nor to its application to sheet feeders. Various changes may be made therein, particularly in the design, arrangement and mode of operation of the parts illustrated, without departing from the spirit and scope of the invention, as will now be apparent to those skilled in the art. For a definition of the limits of the invention, reference is had primarily to the appended claims.

What is claimed is:

1. A rotary valve structure comprising, a stationary casing having a bore therein, a hollow rotor rotatably mounted in said bore, said casing having therein a first passage communicating continuously with the interior of said rotor and leading to the exterior of said casing, a second passage communicating continuously with said bore and leading to the exterior of said casing, and an opening communicating with said first passage and leading to the exterior of said casing, said rotor having in the wall thereof a radial opening located to register with said second passage in one range of rotary positions of said rotor, thereby placing said rotor interior in communication with said second passage, means operatively connected to said rotor for rotating the same, auxiliary valve means operably carried by said casing and arranged in said first passage for closing said casing opening and permitting communication of said rotor interior with the exterior of said casing through said first passage in one position of said valve means, and for opening said casing opening and connecting said first passage with the exterior of said casing through said casing opening in another position of said valve means, and means operatively connected to said auxiliary valve means for moving the same to said positions.

2. A rotary valve structure as defined in claim 1 wherein said auxiliary valve means comprises a cylindrical member having an opening therein comprising two intersecting radially extending recesses and arranged so that in one angular position of said member said casing opening is closed by said member and said rotor interior is placed in communication with the exterior of said casing through said member opening and said first passage, and in another angular position of said member the portion of said first passage between said rotor and said member is closed by the latter and the remaining portion of said first passage is placed in communication with the exterior of said casing through said member opening and said casing opening.

3. A rotary valve structure comprising, a stationary casing having a bore therein closed at opposite ends thereof, at least one of said end closures being a cover member removably mounted on said casing, a hollow rotor rotatably mounted in said bore, said cover member having a passage therein opening at opposite ends thereof through the inner and outer surfaces, respectively, of said cover member, said casing having a passage therein intermediate the ends of said bore and communicating continuously with said bore and leading to the exterior of said casing, said rotor having in the wall thereof a radial opening located to register with said casing passage upon rotation of said rotor, thereby placing the interior of said rotor in communication with said casing passage, and means including a driven annular member disposed between said cover member and said rotor and drivably connected to the latter for rotating the same, said annular member having a passage extending axially therethrough and communicating continuously with said rotor interior, said annular member passage and the inner end of said cover member passage being relatively arranged such that the same are in continuous register with each other, whereby communication between said cover member passage and said rotor interior is established and maintained.

4. A rotary valve structure as defined in claim 3 wherein said annular member passage and the said inner end of said cover member passage are coaxially arranged and aligned with the axis of said rotor, said rotor is provided at the end thereof adjacent said annular member with a transverse wall, said annular member is provided with a concentric hub extending inwardly therefrom and engaged in an opening of a corresponding size and shape in said rotor wall, and said annular member passage continues through said hub and opens into the interior of said rotor.

5. A rotary valve structure as defined in claim 3 wherein the connection between said annular member and said rotor comprises diametrically disposed pins of different diameters secured to one of said elements and extending axially therefrom and parallel with the axis of rotation thereof and loosely engaged in openings of corresponding diameters in the other of said elements.

6. A rotary valve structure as defined in claim 3 wherein said annular member is in the form of a spur gear and the latter is continuously driven by a similar spur gear having meshing engagement therewith and enclosed by said cover member.

7. A rotary valve structure as defined in claim 3 wherein said annular member has an axially extending annular hub portion slidably fitting into said rotor and is thereby supported.

8. A rotary valve structure comprising, a single stationary casing having a bore extending therethrough and of the same diameter from end to end thereof, cover members removably mounted on said casing over the opposite ends of said bore, a single hollow rotor rotatably mounted in said bore and in running contact with the annular wall of said casing surrounding said bore, said rotor being axially divided by an integral transverse wall interiorly thereof into at least two compartments non-communicative with each other, one of said compartments opening through one end of said rotor and the other of said compartments opening through the other end of said rotor, each of said cover members having a passage therein opening at opposite ends thereof through the inner and outer surfaces, respectively, of said cover member, the inner ends of the passages in said cover members being arranged so that they communicate continuously with said rotor compartments, respectively, directly at the ends thereof adjacent said cover members, said casing having therein at least two passages spaced axially of said bore and leading to the exterior of said casing, one of said casing passages opening directly into said bore at a point intermediate the ends of one of said rotor compartments and the other of said casing passages opening directly into said bore at a point intermediate the ends of the other of said rotor compartments, said rotor having in the wall thereof at least two radial openings spaced axially of said rotor, one of said rotor openings communicating directly with one of said rotor compartments and being arranged to register directly with one of said casing passages for a predetermined interval as said rotor rotates and the other of said rotor openings communicating directly with the other of said rotor compartments and being arranged to register directly with the other of said casing passages for a predetermined interval as said rotor rotates, whereby communication is established for said intervals between said casing passages and said rotor compartments, respectively, and means operatively connected with said rotor for rotating the same, said last-mentioned means comprising a driven annular member disposed between one of said cover members and said rotor and drivably connected to the latter, said annular member having a passage extending axially therethrough and continuously registering at one end thereof with the inner end of the passage in the said one of said cover members and communicating continuously at the other end thereof with the rotor compartment adjacent said annular member.

9. A rotary valve structure as defined in claim 8 wherein the passage in the cover member adjacent said driven annular member provides for connecting a source of vacuum with the rotor compartment adjacent said annular member whereby said rotor compartment is continuously evacuated, and the passage in the other cover member provides for connecting a source of compressed air with the other rotor compartment whereby air under pressure is continuously supplied to the said other rotor compartment, the evacuation of the first-named rotor compartment and the air under pressure in the second-named rotor compartment effecting an axial thrust of the rotor in the direction of said annular member, whereby said rotor is pressed against said annular member and the latter in turn is pressed against the adjacent cover member to minimize leakage of air therebetween.

10. A rotary valve structure as defined in claim 9 comprising a thrust member disposed between said annular member and the adjacent cover member, said thrust member having an axial opening therethrough registering with the passage in said cover member and the passage in said annular member.

11. A rotary valve structure as defined in claim 8 wherein said rotor is provided with a transverse wall at the end thereof adjacent said annular member, the passage in said annular member and the inner end of the passage in the adjacent cover member are aligned with the axis of said rotor, said annular member is provided with a concentric hub extending inwardly therefrom and engaged in an opening of a corresponding size and shape in said rotor wall, and said annular member passage continues through said hub and opens into the adjacent rotor compartment.

12. A rotary valve structure as defined in claim 11 wherein said annular member is a toothed member and the connection between said toothed member and said rotor comprises diametrically opposite pins of different diameters fixedly mounted in said toothed member and loosely engaged in openings of corresponding diameters in said rotor.

13. A rotary valve structure as defined in claim 11 wherein the rotor compartment adjacent said annular member is subdivided into inner and outer compartments by a transverse wall spaced inwardly from said end wall, the hub on said annular member extends to and through the inner wall, the passage in said hub and said annular member opens into the inner compartment and communicates with the outer compartment through radial openings formed in said hub, one of the radial openings in said rotor communicates with one of said inner and outer compartments, and said rotor is provided in the annular wall thereof with a third radial opening therethrough communicating with the other of said inner and outer compartments and arranged to register for a predetermined interval with a third passage formed in the casing and opening into the casing bore and leading to the exterior of said casing.

14. A rotary valve structure comprising, a single stationary casing having a bore extending therethrough and of the same diameter from end to end thereof, cover members removably mounted on said casing over the opposite ends of said bore, a single hollow rotor rotatably mounted in said bore and in running contact with the annular wall of said casing surrounding said bore, said rotor being axially divided by an integral transverse wall interiorly thereof into at least two compartments non-communicative with each other, one of said compartments opening through one end of said rotor and the other of said compartments opening through the other end of said rotor, each of said cover members having a passage therein opening at opposite ends thereof through the inner and outer surfaces, respectively, of said cover member, the inner ends of the passages in said cover members being arranged so that they communicate continuously with said rotor compartments, respectively, directly at the ends thereof adjacent said cover members, each of said cover members being provided with an opening leading to the exterior of said cover member and opening into the passage in said cover member at a point intermediate the ends of said passage, and comprising an auxiliary rotor rotatably mounted in said cover member and arranged in said passage in opening and closing relation to said cover member opening, said auxiliary rotor having an opening therein comprising two intersecting radially extending recesses and arranged so that in one angular position of said auxiliary rotor said cover member opening is closed by said auxiliary rotor and said cover member passage is connected with the exterior of said cover member through said auxiliary rotor opening and in another angular position of said auxiliary rotor the portion of said cover member passage between said auxiliary rotor and the exterior of said cover member is connected with the exterior of said cover member through said auxiliary rotor opening and said cover member opening, and means operatively connected with said auxiliary rotor for rotating the same to said positions, said casing having therein at least two passages spaced axially of said bore and leading to the exterior of said casing, one of said casing passages opening directly into said bore at a point intermediate the ends of one of said rotor compartments and the other of said casing passages opening directly into said bore at a point intermediate the ends of the other of said rotor compartments, said rotor having in the wall thereof at least two radial openings spaced axially of said rotor, one of said rotor openings communicating directly with one of said rotor compartments and being arranged to register directly with one of said casing passages for a predetermined interval as said rotor rotates and the other of said rotor openings communicating directly with the other of said rotor compartments and being arranged to register directly with the other of said casing passages for a predetermined interval as said rotor rotates, whereby communication is established for said intervals between said casing passages and said rotor compartments, respectively, and means operatively connected with said rotor for rotating the same.

15. A rotary valve structure as defined in claim 14 wherein said last-named means comprises an elongated member connected at one end thereof with the auxiliary rotor in one of the cover members and connected at the other end thereof with the auxiliary rotor in the other of the cover members, whereby rotation of said auxiliary rotors to said positions is simultaneously effected.

References Cited in the file of this patent

UNITED STATES PATENTS

| | | |
|---|---|---|
| 932,585 | Schley | Aug. 31, 1909 |
| 1,207,769 | Kenney | Dec. 12, 1916 |
| 1,949,875 | Persoons | Mar. 6, 1934 |
| 2,047,615 | Chadborn | July 14, 1936 |
| 2,127,679 | Dudley | Aug. 23, 1938 |
| 2,345,073 | Rosett | Mar. 28, 1944 |
| 2,398,542 | Light | Apr. 16, 1946 |
| 2,467,512 | Weiby | Apr. 19, 1949 |
| 2,477,975 | Frock | Aug. 2, 1949 |
| 2,610,147 | Lindsay | Sept. 9, 1952 |
| 2,616,655 | Hamer | Nov. 4, 1952 |
| 2,693,932 | Richards | Nov. 9, 1954 |

FOREIGN PATENTS

| | | |
|---|---|---|
| 552,778 | Germany | of 1932 |
| 536,370 | Great Britain | of 1941 |